United States Patent [19]
Valadier

[11] 4,411,162
[45] Oct. 25, 1983

[54] GAUGE WIRE DYNAMOMETER WOUND AND CONNECTED IN AN ELECTRICAL BRIDGE ARRANGEMENT

[75] Inventor: Jean-Claude Valadier, Paris, France

[73] Assignee: Testut Aequitas, Paris, France

[21] Appl. No.: 235,913

[22] Filed: Feb. 19, 1981

[30] Foreign Application Priority Data

Mar. 7, 1980 [FR] France ............................ 80 05153
Jun. 20, 1980 [FR] France ............................ 80 13727

[51] Int. Cl.³ .............................................. G01L 1/22
[52] U.S. Cl. ............................... 73/862.65; 73/862.67
[58] Field of Search ........... 73/862.65, 862.63, 862.67, 73/767; 177/211; 338/2, 5

[56] References Cited

U.S. PATENT DOCUMENTS

2,698,371 12/1954 Li ....................................... 73/862.65
2,727,387 12/1955 Cherniak ........................... 73/862.65
2,761,670 9/1956 Fouretier ....................... 73/862.67 X

FOREIGN PATENT DOCUMENTS

757211 9/1956 United Kingdom ............. 73/862.65

*Primary Examiner*—Charles A. Ruehl
*Attorney, Agent, or Firm*—Dressler, Goldsmith, Shore, Sutker & Milnamow

[57] ABSTRACT

A dynamometer comprising a testing body which is deformable under the effect of a force which is applied, in the material of which are defined bearing zones capable of receiving four series of windings of prestressed gauge wire remaining in close contact with the testing body, of which two have principal segments oriented parallel to the force applied, while the two others have principal segments oriented perpendicularly to the force applied, these four series of windings forming an electrical bridge arrangement, the segments oriented parallel to the force applied being located in opposite arms of the bridge arrangement, as are the segments oriented perpendicularly to the force applied. The invention is useful for the production of industrial dynamometers.

18 Claims, 24 Drawing Figures

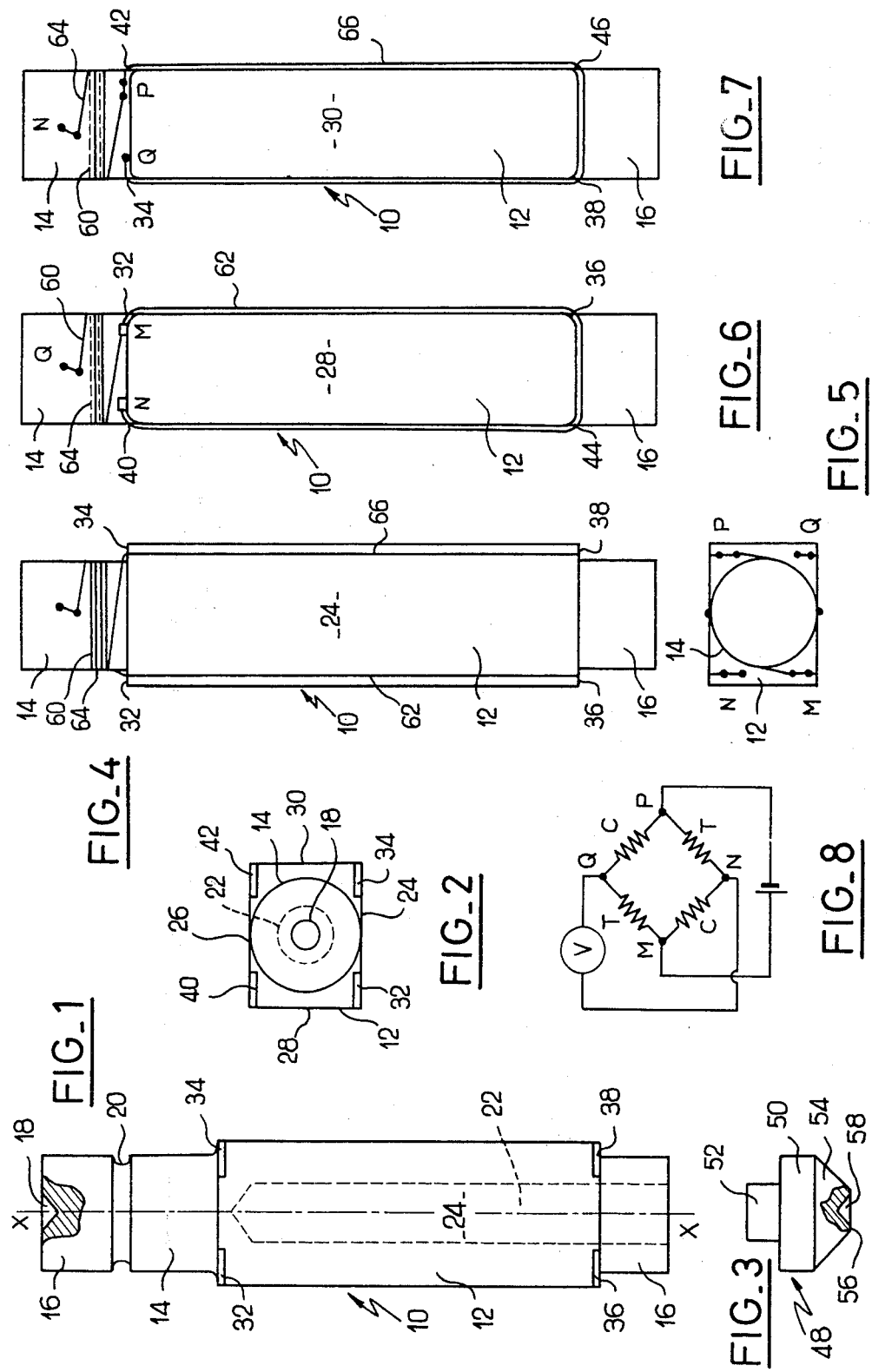

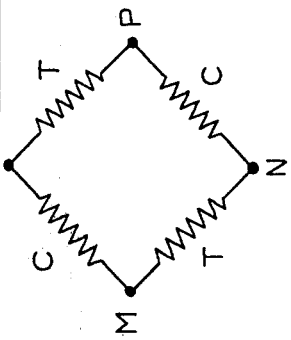
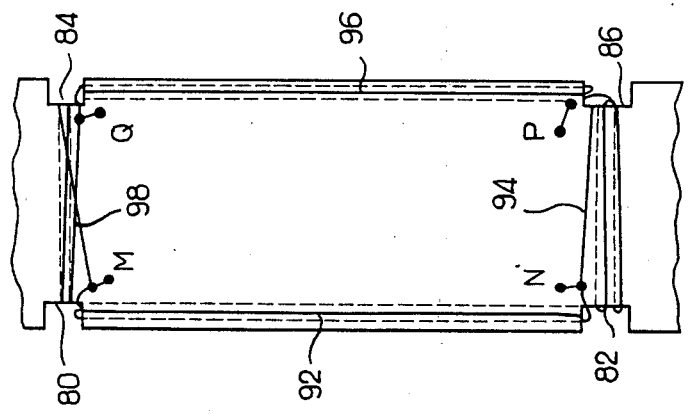
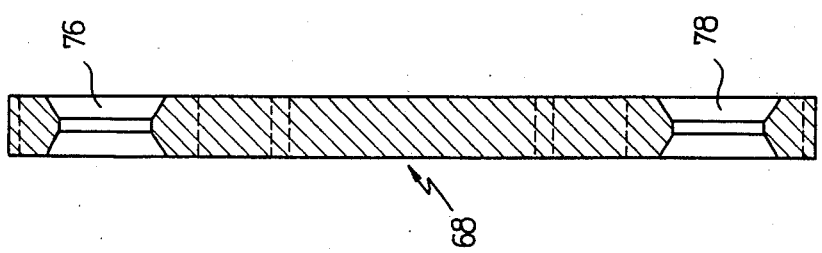
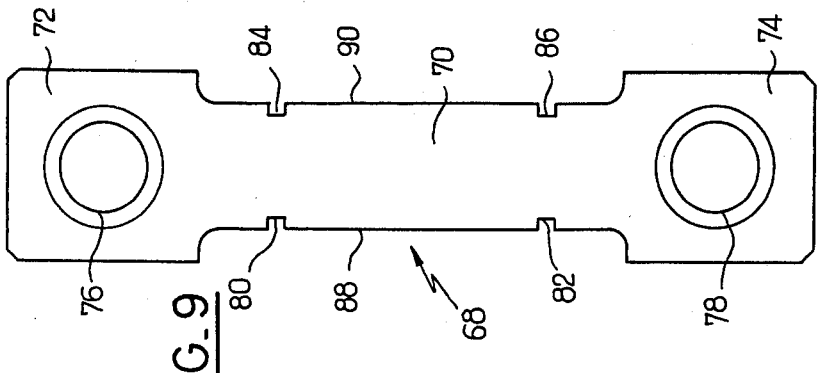
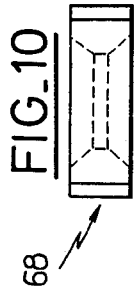

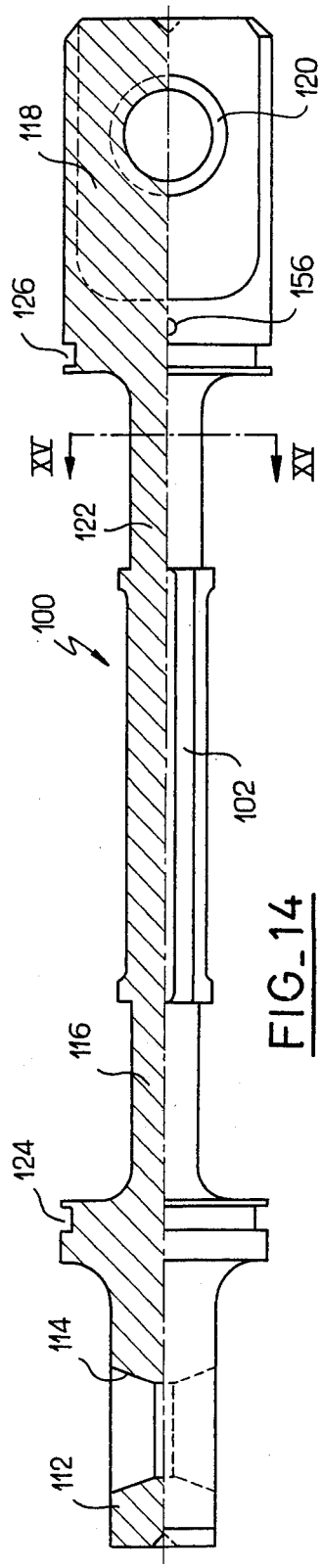
FIG_14
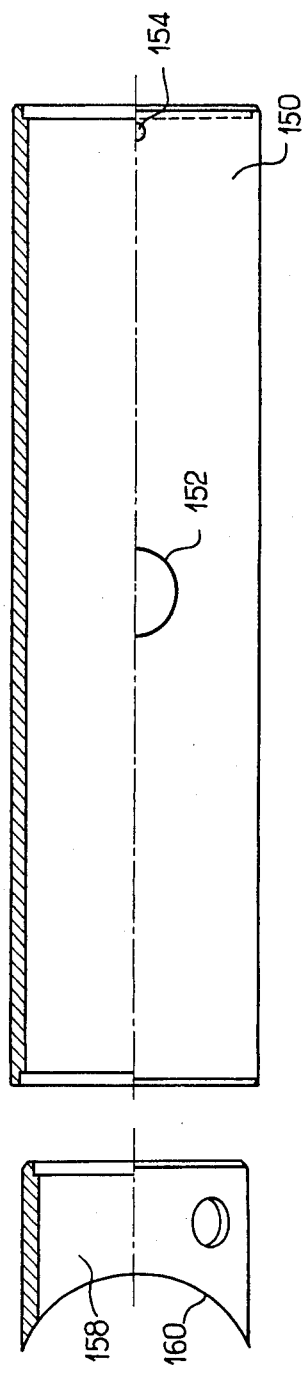
FIG_16
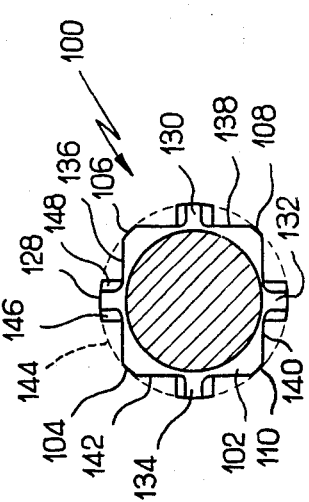
FIG_15
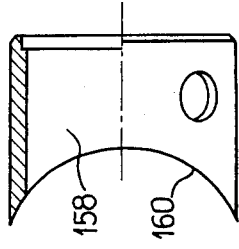
FIG_17

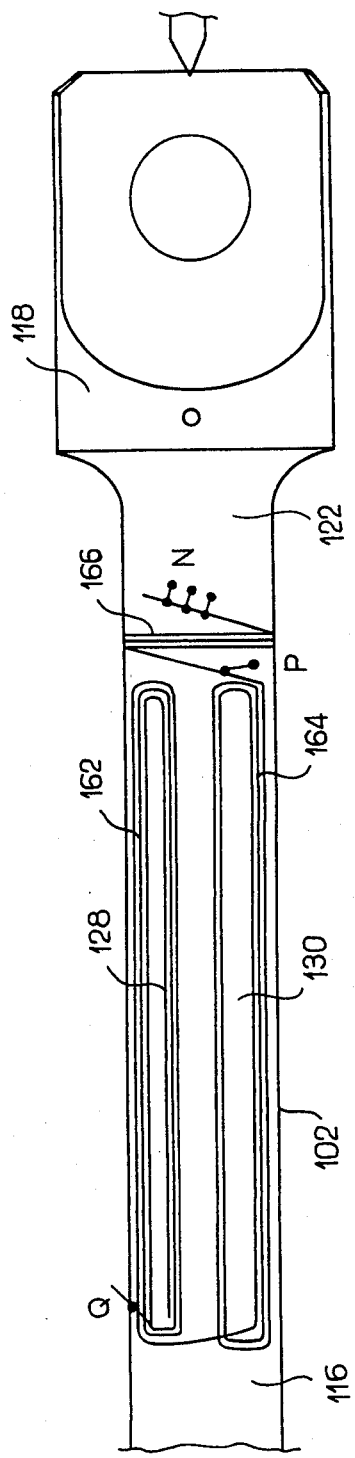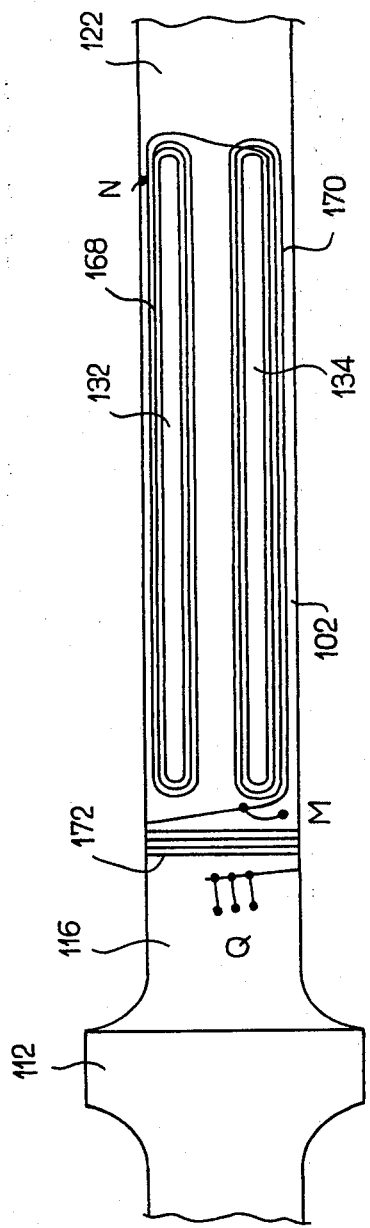
FIG_18
FIG_19

1

GAUGE WIRE DYNAMOMETER WOUND AND CONNECTED IN AN ELECTRICAL BRIDGE ARRANGEMENT

BACKGROUND OF THE INVENTION

This invention relates to a dynamometer which is provided with a testing body which will undergo an elastic deformation when subjected to a force.

The invention relates more particularly to a dynamometer of the type comprising a testing body which is deformable under the effect of an applied force, and sensing means comprising gauge wire adapted to detect this deformation of the testing body, the gauge wire being connected in an electrical bridge arrangement.

In known wire dynamometers, the windings used are either positioned longitudinally with respect to the force applied, or are positioned transversely with respect to the force applied.

These dynamometers have certain disadvantages and notably dynamometers with transverse windings lack sensitivity or linearity in certain applications. Moreover, the production of the windings is not always simple.

SUMMARY OF THE INVENTION

An object of the present invention is to avoid the above-mentioned disadvantages and notably to produce a dynamometer with a wound wire in which the coils or windings may either be produced from a single piece of wire constituting a complete bridge, or from two pieces of wire each constituting a half bridge.

This invention relates more particularly to a dynamometer of the above-mentioned type, which is characterized in that bearing zones are defined in the material of the testing body, which zones are capable of receiving four series of windings of prestressed gauge wire, remaining in close contact with the testing body, two of which have principal segments which are oriented parallel to the force applied, while the other two have principal segments which are oriented perpendicularly to the force applied, these four winding series forming the electrical bridge arrangement, the segments oriented parallel to the force applied being positioned in opposite arms of the bridge arrangement, as are the segments oriented perpendicularly to the force applied.

DESCRIPTION OF THE DRAWINGS

FIG. 1 is a view in elevation of the testing body of a dynamometer operating under compression;

FIG. 2 is a top view of the testing body of FIG. 1;

FIG. 3 is a view in elevation of a bearing member which is to be associated with the testing body of FIG. 1;

FIG. 4 is a view in elevation corresponding to FIG. 1 and schematically showing the arrangement of the series of windings on the testing body;

FIG. 5 is a top view of FIG. 4;

FIGS. 6 and 7 are profile views of the testing body of FIG. 4 and schematically show the arrangement of the series of windings;

FIG. 8 is a schematic representation of the electrical bridge arrangement associated with the testing body of FIGS. 4 to 7;

FIG. 9 is a view in elevation of the testing body of a dynamometer operating under traction;

FIG. 10 is a top view of the testing body of FIG. 9;

FIG. 11 is a longitudinal sectional view of the testing body of FIG. 9;

FIG. 12 is a partial view corresponding to FIG. 9 and illustrating the arrangement of the four series of windings on the testing body;

FIG. 13 is a schematic view of the electrical bridge arrangement associated with the testing body of FIG. 12;

FIG. 14 is a view in elevation with a partial section of the testing body of another dynamometer operating under traction;

FIG. 15 is a sectional view on an enlarged scale, taken along the line XV—XV of FIG. 14;

FIG. 16 is a partial sectional view in elevation of a covering which is to be associated with the testing body of FIG. 14;

FIG. 17 is a partial sectional view in elevation of a casing associated with the covering represented in FIG. 16;

FIG. 18 is a partial view of the testing body of FIG. 14, illustrating the arrangement of the series of windings forming a half bridge;

FIG. 19 is a partial view illustrating the arrangement of the series if windings forming the other half bridge;

DETAILED DESCRIPTION OF THE INVENTION

Figure 20:
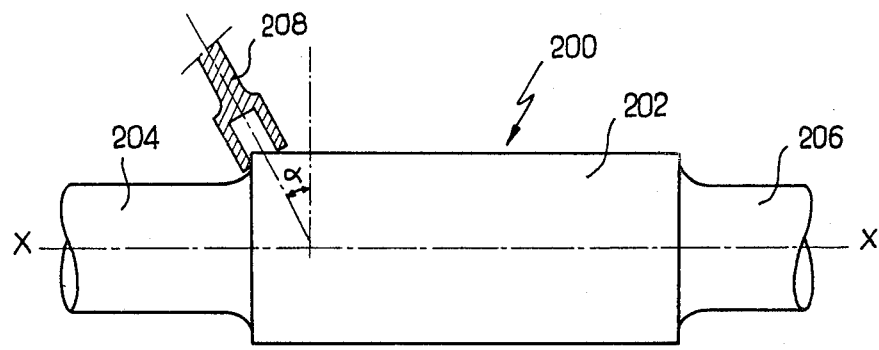
FIG. 20 is a view in profile of the testing body of a dynamometer according to the invention, of which the circular shoulders are being machined using a drill represented in axial section.

For reasons of simplification, the longitudinal or transverse windings may be qualified according to whether their principal segments are oriented parallel or respectively perpendicularly to the force applied.

When the dynamometer operates under compression, the longitudinal windings are compressed and the transverse windings are stretched under the effect of the force applied, whereas when the dynamometer operates under traction, the longitudinal windings are stretched and the transverse windings are compressed under the effect of the force applied.

According to another characteristic of the invention, the gauge wire is preferably insulated wire with a conductive, substantially constant cross-section.

The testing body advantageously has the general shape of a straight prism or cylinder, the axis of which is parallel to the direction of the force applied, this testing body being provided with an even number of recesses or projections, receiving the two series of windings, the principal segments of which are oriented parallel to the force applied.

These recesses or projections are advantageously positioned in the vicinity of the series of windings, the principal segments of which are oriented perpendicularly to the force applied. If required, they may be used for receiving at least one series of windings, the principal segments of which are oriented perpendicularly to the force applied.

These recesses or projections, in an even number, are position symmetricaly along the axis of the dynamometer.

The four series of windings may be produced by continuous winding on the testing body, four output wires being connected to the four interconnections thereof. In this case, one piece of wire may be used for forming the complete bridge.

The four series of windings may comprise two series of windings produced by continuous winding on the testing body and constituting a half bridge and two other series of windings interconnected continuously on the testing body and constituting another half bridge, four output wires being connected to the four interconnections of the series of windings. It is then possible to use two pieces of wire, each constituting a half bridge.

The four series of windings may each comprise a single winding. It is also possible for the series of windings, the principal segments of which are oriented parallel to the force applied, to each comprise a pair of windings which are continuously interconnected.

Moreover, it is possible to provide an insulating layer of the anodizing type, varnish, a coating of paste or similar furnishings between the gauge wire and the testing body.

As a variation, the bearing zones receiving the two series of windings having their principal segments oriented parallel to the force applied may be constituted by circular shoulders machined in the material of the testing body to form a circular edge used for anchoring the gauge wire, so as to allow a simple anchorage of the gauge wire without a risk to the enamel of the latter.

According to this variation, the circular edge of the shoulder is advantageously produced with its generatrix inclined on the testing body to produce an inclined retention edge. This characteristic allows a shoulder slope to be obtained which is favourable for the positioning of the gauge wire and also allows a very obtuse angle to be obtained at the level of the connection of this shoulder with the testing body.

The circular shoulder is advantageously machined using an annular drill which produces an annular raising in the material of the testing body. In order to produce the previously described incline of the shoulder, it thus suffices to produce the machining of the shoulder with the drill, the axis of which is inclined at the desired angle while still being in the same plane with that of the testing body.

The testing body is advantageously in the general shape of a straight prism or straight cylinder, in which the shoulders are machined on two opposite edges of said prism or cylinder, the gauge wire passing alternately around a shoulder of one of the edges, then around a shoulder of the other edge to produce a series of windings, the principal sections of which are oriented parallel to the force applied.

The shoulders of the two edges are advantageously positioned in a staggered arrangement such that the principal edges are substantially parallel to the force applied.

The shoulders are advantageously in an odd number on one edge as well as on the other edge.

Other characteristics and advantages of this invention will be more fully comprehended from reading the detailed description which follows, referring to the accompanying drawings which are only provided by way of illustration.

DESCRIPTION OF PREFERRED EMBODIMENTS

FIG. 1 represents the testing body 10 of a dynamometer which is to operate under compression. This testing body 10 is formed from a single member and comprises a centre part 12 in the form of a straight prism of rectangular cross-section, an upper end part 14 in the form of a straight cylinder and a lower end part 16 in the form of a straight cylinder, these three parts being arranged along the same axis XX.

The end part 14 comprises a circular face 16 provided in the centre thereof with a conical notch 18 and a peripheral annular groove 20. The testing body 10 also comprises a bore 22 located in the axis XX and made through the end part 16 and the centre part 12. The centre part 12 in the form of a prism of rectangular cross-section has two opposite faces 24 and 26 corresponding to the two large sides of the rectangle and two opposite faces 28 and 30 corresponding to the two small sides of the rectangle (cf FIG. 2). As may be seen in FIG. 2, the end part 14 has a diameter corresponding to the small side of the rectangular section of the centre part 12. This allows the production of ridge portions on the faces 24 and 26 for the positioning of longitudinal winding series, as will be explained below.

The face 24 of the centre part 12 comprises four rounded ridge portions 32, 34, 36 and 38 and likewise, the face 26 comprises four rounded ridge portions 40, 42, 44 and 46. These rounded ridge portions constitute bearing zones which are capable of receiving series of prestressed gauge wire windings without the risk of rupturing the insulator of the gauge wire.

The lower end part 16 of the testing body 10 is provided to receive a bearing member 48 shown in FIG. 3. This bearing member 48 comprises a centre cylindrical part 50, an end cylindrical portion 52 adapted to enter inside the bore 22 and an end portion 54 in the shape of a truncated cone having a lower face 56 provided with a conical notch 58 analogous to the conical notch 18.

The bearing zones constituted by the rounded ridge portions which were previously described and by the end part 14 are used for positioning four series of windings remaining in close contact with the testing body and connected in an electrical bridge arrangement, of the Wheatstone bridge type, as shown in FIG. 8.

As is shown in FIGS. 4 to 7, the testing body 10 is provided with a first piece of wire QMN, forming a half bridge with a second piece of wire NPQ forming the other half bridge.

The piece QMN comprises a first series of windings 60 leaving from the point Q on the end part 14, arranged around the latter and arriving at point M and comprises a second series of windings 62 leaving from the point M passing around the four ridges 32, 36, 44 and 40 and ending at the point N. The series of windings QM constitutes a stretched part designated by the letter T in FIG. 8 and the piece MN constitutes a compressed part designated by the letter C in FIG. 8.

The piece NPQ comprises a first series of windings 64 leaving from the point N, arranged around the end part 14 and ending at a point P, and comprises a second series of windings 66 leaving from the point P, passing successively around the ridges 42, 46, 38 and 34 to end at the point Q. The piece 64 constitutes a stretched piece T and the piece 66 constitutes a compressed piece C, as shown in FIG. 8. As may be seen in FIG. 4, the pieces 60 and 64 are interlaced around the end part 14. In FIG. 6, the piece 60 has been shown in a solid line and the piece 64 of the other half bridge has been shown in a dotted line, and conversely, in FIG. 7, the piece 64 has been shown in a solid line and piece 60 of the other half bridge in a dotted line. The end part 14 constitutes a bearing zone for the series of windings 60 and 64.

As will be seen in FIG. 8, the two wires T are arranged in opposite arms of the bridge, as are the two wires C. Apart from any charge applied to the testing body, the Wheatstone bridge is balanced, i.e. the nominal resistances of the wires T (windings 60 and 64) and of the wires C (windings 62 and 66) are equal. The intercalated arrangement of these four windings allows the production of a maximum sensitivity when the potential difference $V_Q-V_N$ is measured, which should be zero at rest. Its value, measured, for example, by a precision voltmeter V allows measurement of the cumulated variations of the resistances C and T which are due to Poisson's effect, induced by the charge applied. In practice, a potential difference of 12 volts may be imposed on the terminals N and P of the bridge and the voltage $V_Q-V_M$ is measured to deduce, by previous standardization, the value of the force applied.

FIG. 9 shows the testing body 68 of a dynamometer which is to operate under traction. The testing body 68 is produced from a single piece and comprises a centre part 70 in the form of a straight prism of rectangular cross-section and comprises two end parts 72 and 74 provided respectively with an opening 76 and opening 78 allowing the testing body to be connected to a stationary point and to a load tending to stretch this testing body. The testing body 68 is produced by machining from a metallic plate, notably made of a light alloy, and in addition to the above-mentioned openings 76 and 78, comprises four recesses 80, 82, 84 and 86 forming four bearing zones for the positioning of the gauge wire. The recesses 80 and 82 are made on a face 88 constituting a small side of the rectangular cross section of the straight prism 70 and the recesses 84 and 86 are made on a face 90 opposite the face 88 and constituting the other small side of the rectangle.

The testing body shown in FIGS. 9 to 11 allow the production of a complete winding with a single piece of wire.

A first series of windings 92 MN is initially formed starting from the point M near the recess 80 by introducing the gauge wire into the recess 80, then into the recess 82 and by making the necessary number of turns passing into these two recesses and thus to end at the point N. From the point N, a second series of windings 94 is produced by passing in the recesses 82 and 86 and thus arriving at the point P. From P, a third series of windings 96 is produced by passing through the recesses 84 and 86 so as to arrive at the point Q. From point Q, a fourth series of windings 98 is produced by passing around the recesses 80 and 84.

The series of windings 92 and 96 constitute stretched sections T whereas the windings 94 and 98 constitute compressed sections C. These compressed and stretched sections are arranged as a bridge as is shown in FIG. 13, the stretched sections being in opposite arms of the bridge as are the compressed sections.

This bridge is associated with a voltmeter and a power supply as previously described with reference to FIGS. 1 to 8.

FIG. 14 represents the testing body 100 of a dynamometer which is to operate under traction. This testing body 100 comprises a centre part 102 having the general shape of a straight prism of square section, of which four longitudinal ridges 104, 106, 108 and 110 have been cut away as shown in FIG. 15. The testing body 100 also comprises an end part 112 provided with an opening 114 and connected to the part 102 by a part 116 of circular cross section, and an end part 118 provided with an opening 120 and connected to the part 102 by a part 122 of circular cross section.

The openings 114 and 120 are arranged such that their respective axes are orthogonal.

The part 112 also comprises a peripheral circular groove 124 arranged in the axis of the centre part 102, and similarly the end part 118 comprises a circular peripheral groove 126 also arranged along the same axis. These grooves 124 and 126 are each adapted to receive a toroidal air seal interposed between the grooves and a cover shown in FIG. 16.

The centre part 102 comprises four longitudinal projections 128, 130, 132 and 134 positioned respectively on the faces 136, 138, 140 and 142 of the straight prism constituting the centre part 102. These longitudinal projections are inscribed in a circle represented schematically by the broken line 114 in FIG. 15. Each of the longitudinal projections 128, 130, 132 and 134 is rounded off at its two ends to facilitate the positioning of the gauge wire, as will be explained below. Thus, the projections 128 has two ridge flangings 146 and 148 on its end, visible in FIG. 15.

FIG. 16 represents a cylindrical cover 150 which is adapted to surround the centre part 102 of the testing body 100. This cover 150 comprises an opening 152 for the passage of the electrical connections and an opening 154 for the positioning of a stop (not shown) capable of being introduced into an opening 156 of the end part 118. When the testing body 100 is extended under the effect of traction, the cover 150 may slide relatively to the end parts 112 and 118, owing to the toroidal seal positioned in the grooves 124 and 126 and co-operating with the inside of the cover 150.

The cover 150 is provided at its two ends with end casings such as 158, shown in FIG. 17. These casings are soldered on the edges of the cover 150 and have a circular cut 160 which is positioned around the corresponding opening 114 or 120.

The positioning of the series of windings will now be described with reference to FIGS. 18 and 19. As shown in FIG. 18, the projections 128 and 130 are used for positioning a series of windings of which the principal segments are oriented parallel to the force applied. This series comprises a first winding 162 around the projection 128 and a second winding 164 around the projection 130. This first series of windings is continuously connected to a second series of windings constituted by a single winding 166 coiled around the section 122. These two series of windings form a half bridge constituted by a single section passing through the points Q,P,N forming a straight half bridge. The windings 162 and 164 constitute stretched sections, whereas the winding 166 constitutes a section compressed under the effect of the force applied.

In like manner, the projections 132 and 134 are used for positioning a first series of windings comprising a winding 168 around the projections 132 and a winding 170 around the projection 134. A second series of windings comprising a single winding 172 is positioned around the section 116. These two series of windings constitute the second half bridge passing through the points N, M and Q. This second half bridge is formed from a single section positioned from the point N so as to pass around the projection 132 several times, then around the projection 134 and finally around the section 116. The windings 168 and 170 constitute stretched sections, whereas the winding 172 constitutes a section compressed under the effect of the force applied. The points Q, M and N may be connected in an appropriate manner to a voltmeter and to a power source, as described above.

FIG. 20 illustrates the testing body 200 of a dynamometer which is to operate under traction. This testing body 200 is an integral structure produced from a light anodizable alloy and comprises a centre section 202 in the form of a straight cylinder as well as two end sections 204 and 206 in the form of a straight cylinder, these three sections being positioned along the same axis XX. The end sections 204 and 206 each receive a series of windings of which the principal parts are oriented perpendicularly to the force applied, i.e. perpendicularly to the axis XX, and the centre section 202 receives two series of windings of which the principal parts are oriented substantially parallel to the force applied, i.e. substantially parallel to the axis XX.

In order to facilitate the anchoring of the windings which have their principal parts oriented parallel to the force applied, circular shoulders are machined on the centre section 202 using a drill 208, represented in axial section in FIG. 20. This drill is an annular drill which is entrained in rotation around its axis and it produces an annular raising in the material of the testing body while leaving a circular shoulder at the centre of this raising of material.

The drill 208 is positioned with its rotational axis arranged in the same plane as that of the testing body, but inclined by an angle α with respect to the perpendicular to the axis XX so as to constitute an anchorage edge presenting the same incline.

Figure 21:
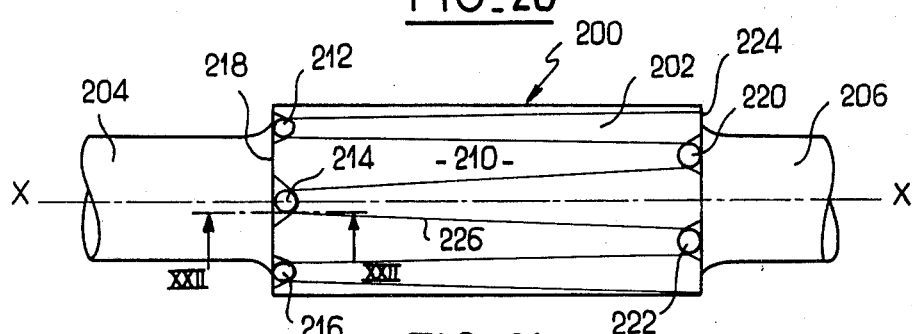
FIG. 21 is a top view of the testing body of FIG. 20 illustrating the circular shoulders.

On half a cylindrical portion 210 of the centre section 202, circular shoulders are produced and it is seen in FIG. 21 that there are three circular shoulders 212, 214 and 216 on an edge 218 of the cylindrical portion 210 and two circular shoulders 220 and 222 on the other edge 224 of this portion 210, the shoulders being in an odd number on each edge and being positioned in a staggered arrangement to allow the positioning of a series of windings formed from a single piece of wire 226.

Figure 22:
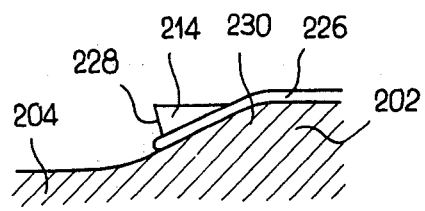
FIG. 22 is a partial sectional view along the line XXII—XXII of FIG. 21.

FIG. 22 shows in section the shoulder 214 of FIG. 21 and the anchorage of the gauge wire 226 around this circular shoulder. Due to the incline given to the drill 208, the circular shoulder 214 has a circular edge 228 of which the generatrix is inclined by the same angle α and ensures a good anchorage of the wire 226, which is thus acted on in the direction of the testing body. Moreover, due to the incline according to an acute angle, a very obtuse angle 230 is located at the level of the connection of the machining with the testing body 202.

The testing body of FIGS. 20 and 21 receives four series of windings of gauge wire according to the principle of winding described with reference to FIGS. 18 and 19.

Figure 24:
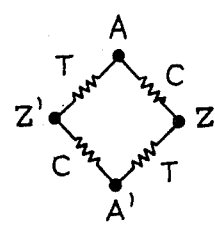
FIG. 24 schematically represents the electrical bridge arrangement of the series of windings of the test body of FIG. 23.

This testing body receives a first series of windings of gauge wire comprising a piece AZ wound round the section 204 and constituting a winding of which the principal parts are oriented perpendicularly to the force applied. The testing body receives a second series of windings comprising a piece ZA' passing alternately around a circular shoulder of one of the edges 208 to a circular shoulder of the other edge 224 of the centre section 202 to produce a winding of which the principal segments have their pieces oriented parallel to the force applied. The shoulders of the edges 218 and 220 are in staggered arrangement, the shoulders being in an odd number on the edge 218 as well as on the edge 224. The pieces AZ and ZA' constitute a half Wheatstone bridge as is shown in FIG. 24. The piece AZ constitutes a compressed piece whereas the piece ZA' constitutes a stretched piece.

Figure 23:
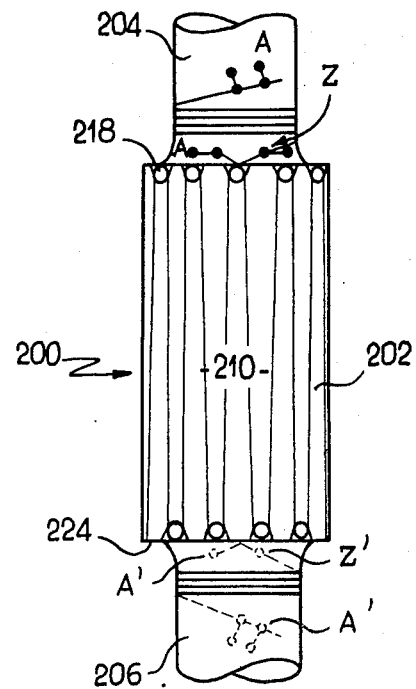
FIG. 23 is a view analogous to that of FIG. 21, illustrating the arrangement of the series of gauge wire windings on the testing body.

The testing body of FIG. 23 also receives two other series of windings constituting the other half Wheatstone bridge of FIG. 24. Thus, it comprises another piece A'Z' wound round the end section 206 and a piece Z'A positioned around shoulders arranged in an anologous manner on the other cylindrical portion of the section 202. The piece A'Z' constitutes a compressed piece and the piece Z'A constitutes a stretched piece. The stretched pieces are designated by the symbol T and the compressed pieces by the symbol C in FIG. 24.

The positioning of the gauge wire on the testing body may be advantageously effected using a specific winder which is known per se and is held manually. This winder comprises a delivery spool on which is wound the gauge wire and a hollow body terminated by a hollow needle through which passes the gauge wire coming from the delivery spool.

In the embodiments which have been described above, the testing bodies are produced from a material which has elastic properties, for example an aluminium alloy.

The bearing zones (projections or recesses) made in the testing body may be machined, for example, in the solid or may be obtained by smelting, forging, forming, electroerosion, rolling or by any other suitable method.

The resistant wire which is used is enamelled and is thus insulated to allow the use of any metal to produce the testing body and to cross the wires and to have joining spirals. It will be noted that the use of a testing body made of a light alloy allows on the other hand the use of bare wire.

It will be noted that the arrangement of the gauge wire by a continuous half bridge in which the same piece of wire constitutes a compressed gauge and a stretched gauge is a very favourable characteristic for the acquisition of a slight zero, drift from the pick up. Moreover, the winding by a complete continuous bridge with a single piece of wire, even if a disadvantage thereof is the necessity of numerous wire overlappings, nevertheless retains the advantage of the condition of a slight zero drift.

The principal advantage of producing the bearing zones in the form of shoulders is seen in their simplicity of machining which allows an easy multiplication of the number thereof and consequently allows a variation in the number of advance and return of the gauge wire and thus allows elevated resistances to be reached and above all, an improved integration of the deformations of the testing body.

As indicated above, the testing body may be advantageously produced from a light anodizable alloy, the gauge wire coming into close contact with the testing body. Due to the shoulders having a circular edge, it is thus no longer necessary to file the ridges so as not to rupture the enamel of the wire. It is possible to devise winding forms other than those previously indicated, in which the shoulders are in a staggered arrangement and in an odd number.

The invention is naturally not restricted to the embodiments which are particularly described and shown and it is possible to device other embodiments without exceeding the scope of the invention.

This invention allows the production of industrial dynamometers operating under traction or under compression.

I claim:

1. A dynamometer of the type comprising a testing body having a substantially continuous solid surface, said body being deformable under the effect of an applied force, sensing means comprising gauge wire and adapted to detect said deformation of the testing body, the gauge wire being connected in an electrical bridge arrangement, said body defining bearing zones formed integrally as a part of the material of the testing body, which zones are adapted to receive and retain in position four series of windings of prestressed gauge wire, remaining in close contact with the testing body, a first two of which having principal segments oriented parallel to the force to be applied, and the other two of which having principal segments oriented perpendicularly to the force to be applied, said four series of windings forming the electrical bridge arrangement, the segments oriented parallel to the force to be applied being located in opposite arms of the bridge arrangement, as are the segments oriented perpendicularly to the force to be applied, said bearing zones receiving the first two series of windings having their principal segments oriented parallel to the force to be applied being constituted by circular shoulder machined in the material of the testing body to produce a circular edge used for anchoring the gauge wire.

2. A dynamometer according to claim 1, wherein the circular edge of the shoulder has its generatrix inclined on the testing body to produce an inclined retention edge.

3. A dynamometer according to claim 1, wherein the circular shoulder is machined using an annular drill which produces an annular raising in the material of the testing body.

4. A dynamometer according to claim 1, wherein the testing body is in the general form of a straight prism, the shoulders are machined on two opposite edges of said prism, and the gauge wire passes alternately around a shoulder of one of the edges, then around a shoulder of the other edge to produce the first two series of windings of which the principal segments are oriented parallel to the force to be applied.

5. A dynamometer according to claim 4, wherein the shoulders of the two edges are in staggered arrangement.

6. A dynamometer according to claim 4, wherein the shoulders are in an odd number on each of the edges.

7. A dynamometer according to claim 1, wherein the testing body is in the general form of a cylinder, the shoulders are machined on two opposite edges of said cylinder, and the gauge wire passes alternately around a shoulder of one of the edges, then around a shoulder of the other edge to produce said first two series of windings of which the principal segments are oriented parallel to the force to be applied.

8. A dynamometer according to claim 7, wherein the shoulders of the two edges are in a staggered arrangement.

9. A dynamometer according to claim 7, wherein the shoulders are in an odd number on each of the edges.

10. A dynamometer of the type comprising a testing body deformable under the effect of an applied force, sensing means comprising gauge wire and adapted to detect said deformation of the testing body, the gauge wire being connected in an electrical bridge arrangement, wherein bearing zones are defined in the material of the testing body, which zones are adapted to receive four series of windings of prestressed gauge wire, remaining in close contact with the testing body, two of which have principal segments oriented parallel to the force to be applied, while the other two have principal segments oriented perpendicularly to the force to be applied, these four series of windings forming the electrical bridge arrangement, the segments oriented parallel to the force to be applied being located in opposite arms of the bridge arrangement, as are the segments oriented perpendicularly to the force to be applied, the bearing zones receiving the two series of windings having their principal segments oriented parallel to the force to be applied being constituted by circular shoulders machined in the material of the testing body to produce a circular edge used for anchoring the gauge wire.

11. A dynamometer according to claim 10, wherein the circular edge of the shoulder has its generatrix inclined on the testing body to produce an inclined retention edge.

12. A dynamometer according to claim 10, wherein the circular shoulder is machined using an annular drill which produces an annular raising in the material of the testing body.

13. A dynamometer according to claim 10, wherein the testing body is in the general form of a straight prism, the shoulders are machined on two opposite edges of said prism and the gauge wire passes alternately around a shoulder of one of the edges, then around a shoulder of the other edge to produce the two series of windings of which the principal segments are oriented parallel to the force to be applied.

14. A dynamometer according to claim 13, wherein the shoulders of the two edges are in a staggered arrangement.

15. A dynamometer according to claim 13, wherein the shoulders are in an odd number on each of the edges.

16. A dynamometer according to claim 10, wherein the testing body is in the general form of a cylinder, the shoulders are machined on two opposite edges of said cylinder and the gauge wire passes alternately around a shoulder of one of the edges, then around a shoulder of the other edge to produce the two series of windings of which the principal segments are oriented parallel to the force to be applied.

17. A dynamometer according to claims 16, wherein the shoulders of the two edges are in a staggered arrangement.

18. A dynamometer according to claim 16, wherein the shoulders are in an odd number on each of the edges.

* * * * *